US008225068B2

(12) United States Patent
Nogueras et al.

(10) Patent No.: US 8,225,068 B2
(45) Date of Patent: Jul. 17, 2012

(54) VIRTUAL REAL MEMORY EXPORTATION FOR LOGICAL PARTITIONS

(75) Inventors: Jorge Rafael Nogueras, Austin, TX (US); James A. Pafumi, Leander, TX (US); Morgan Jeffrey Rosas, Cedar Park, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 12/135,508

(22) Filed: Jun. 9, 2008

(65) Prior Publication Data

US 2009/0307458 A1    Dec. 10, 2009

(51) Int. Cl.
    *G06F 12/00*    (2006.01)
(52) U.S. Cl. ........................... 711/203; 711/173
(58) Field of Classification Search .............. 711/6, 203, 711/173
    See application file for complete search history.

(56) References Cited

U.S. PATENT DOCUMENTS

| | | | |
|---|---|---|---|
| 6,202,134 B1 * | 3/2001 | Shirai ........................... 711/159 |
| 7,089,457 B2 | 8/2006 | Stevens | |
| 7,290,259 B2 | 10/2007 | Tanaka et al. | |
| 7,624,262 B2 * | 11/2009 | Diep et al. ........................ 713/2 |
| 2006/0095690 A1 | 5/2006 | Craddock et al. | |
| 2006/0195642 A1 | 8/2006 | Arndt et al. | |
| 2006/0253682 A1 | 11/2006 | Armstrong et al. | |
| 2007/0169121 A1 | 7/2007 | Hunt et al. | |

* cited by examiner

*Primary Examiner* — Mardochee Chery
(74) *Attorney, Agent, or Firm* — Yee & Associates, P.C.; David A. Mims, Jr.

(57) ABSTRACT

A computer implemented method, apparatus, and program product for extending virtual memory associated with logical partitions. A hosting partition receives a paging request from a logical partition on a logically partitioned data processing. The hosting partition identifies a location of the physical memory space on a remote computing device assigned to the logical partition and sends an extended virtual memory paging request to an extended virtual memory manager located on the remote computing device using a network connection. The extended virtual memory paging request comprises the instructions for the memory page-in or the memory page-out and the location of the physical memory space on the remote computing device that is being paged-in or paged-out. The extended virtual memory manager performs a page-in operation or a page-out operation in accordance with the instructions for the memory page-in or memory page-out.

16 Claims, 5 Drawing Sheets

VIRTUAL REAL MEMORY EXPORTATION FOR LOGICAL PARTITIONS

BACKGROUND OF THE INVENTION

1. Field of the Invention

The present invention is related generally to a data processing system and in particular to a method and apparatus for logically partitioned data processing systems. More particularly, the present invention is directed to a computer implemented method, apparatus, and computer usable program code for extending virtual real memory that is available to logical partitions by utilizing remote physical disk storage space through a reliable network connection.

2. Description of the Related Art

Increasingly large symmetric multi-processor data processing systems are frequently being partitioned and used as smaller systems. These systems are referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platforms resources. These platform allocable resources include one or more architecturally distinct processors and their interrupt management area, regions of system memory, and input/output (I/O) adapter bus slots. The partition's resources are represented by the platform's firmware to the operating system image.

Each distinct operating system or image of an operating system running within a platform is protected from each other, such that software errors on one logical partition cannot affect the correct operation of any of the other partitions. This protection is provided by allocating a disjointed set of platform resources to be directly managed by each operating system image and by providing mechanisms for ensuring that the various images cannot control any resources, such as memory space, that have not been allocated to that partition image. With respect to hardware resources in a logical partitioned data processing system, these resources are shared dis-jointly among various partitions. These resources may include, for example, input/output (I/O) adapters, memory DIMMs, non-volatile random access memory (NVRAM), and physical hard disk drive space. Thus, each image of the operating system, or each different operating system, directly controls a distinct set of allocable resources within the platform.

BRIEF SUMMARY OF THE INVENTION

According to one embodiment of the present invention, a computer implemented method, apparatus, and computer program code for extending virtual memory associated with logical partitions is provided. A hosting partition receives a paging request from an extended virtual memory logical partition on a logically partitioned data processing system. The extended virtual memory logical partition is assigned to physical memory space on the remote computing device. The paging request comprises instructions for a memory page-in or a memory page-out to the physical memory space assigned to the extended virtual memory logical partition. The hosting partition identifies a location of the physical memory space on the remote computing device assigned to the extended virtual memory logical partition located on the logically partitioned data processing system. The hosting partition sends an extended virtual memory paging request from the hosting partition to an extended virtual memory manager located on the remote computing device using a network connection. The extended virtual memory paging request comprises the instructions for the memory page-in or the memory page-out and the location of the physical memory space on the remote computing device that is being paged-in or paged-out. The extended virtual memory manager performs a page-in operation or a page-out operation on the physical memory space assigned to the extended virtual memory logical partition in accordance with the instructions for the memory page-in or memory page-out.

DETAILED DESCRIPTION OF THE INVENTION

Figure 1:
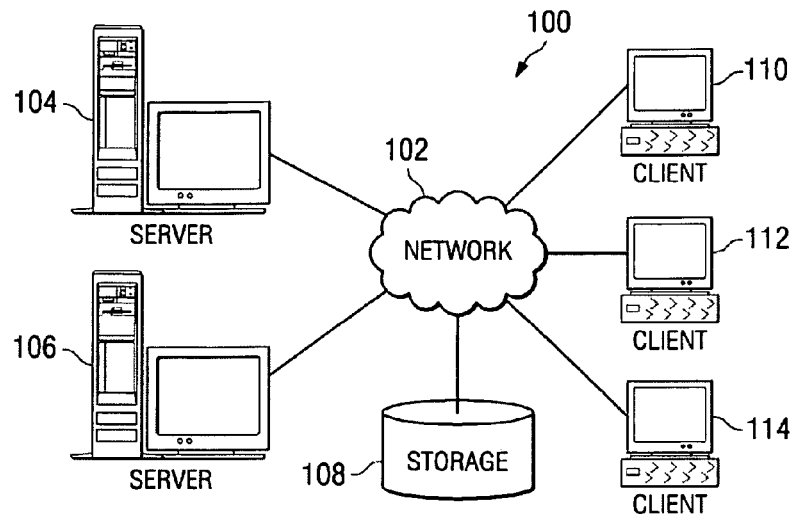
FIG. 1 is a block diagram of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
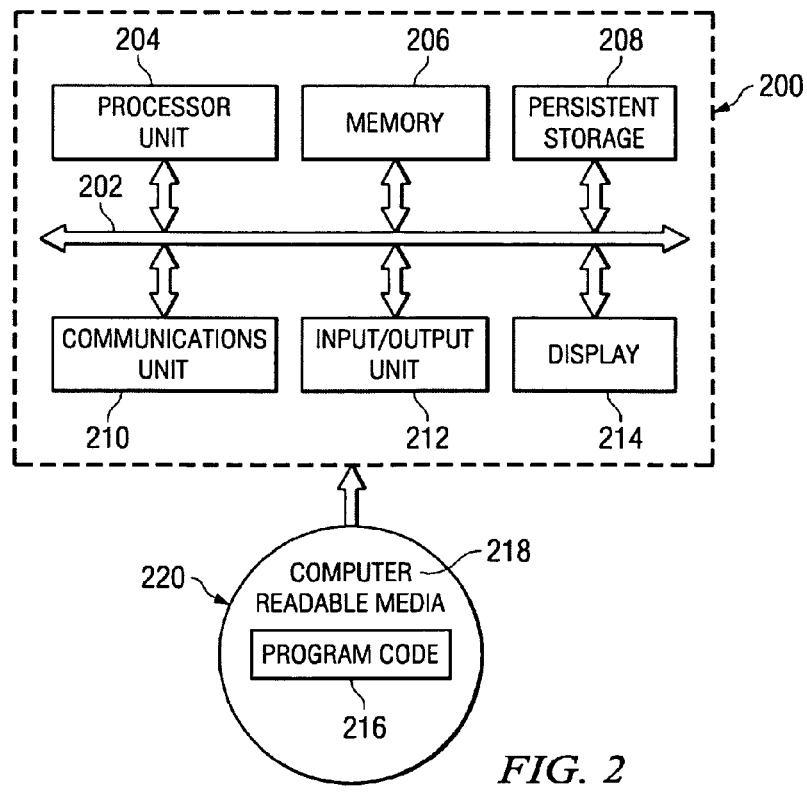
FIG. 2 is a block diagram of a data processing system is shown in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. Server 104 is a logically partitioned data processing system having one or more logical partitions. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. When server 104 no longer has available physical disk storage space available for the creation of new logical partitions, server 104 requests available physical disk storage space from server 106 or any other server that is reachable through network 102. In this manner, server 104 is able to obtain and utilize any available physical disk storage space that is available on any server or client device connected through network 102. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation.

Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or nonvolatile storage device. Persistent storage 208 may take various forms depending on the particular implementation. For example, persistent storage 208 may contain one or more components or devices and may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
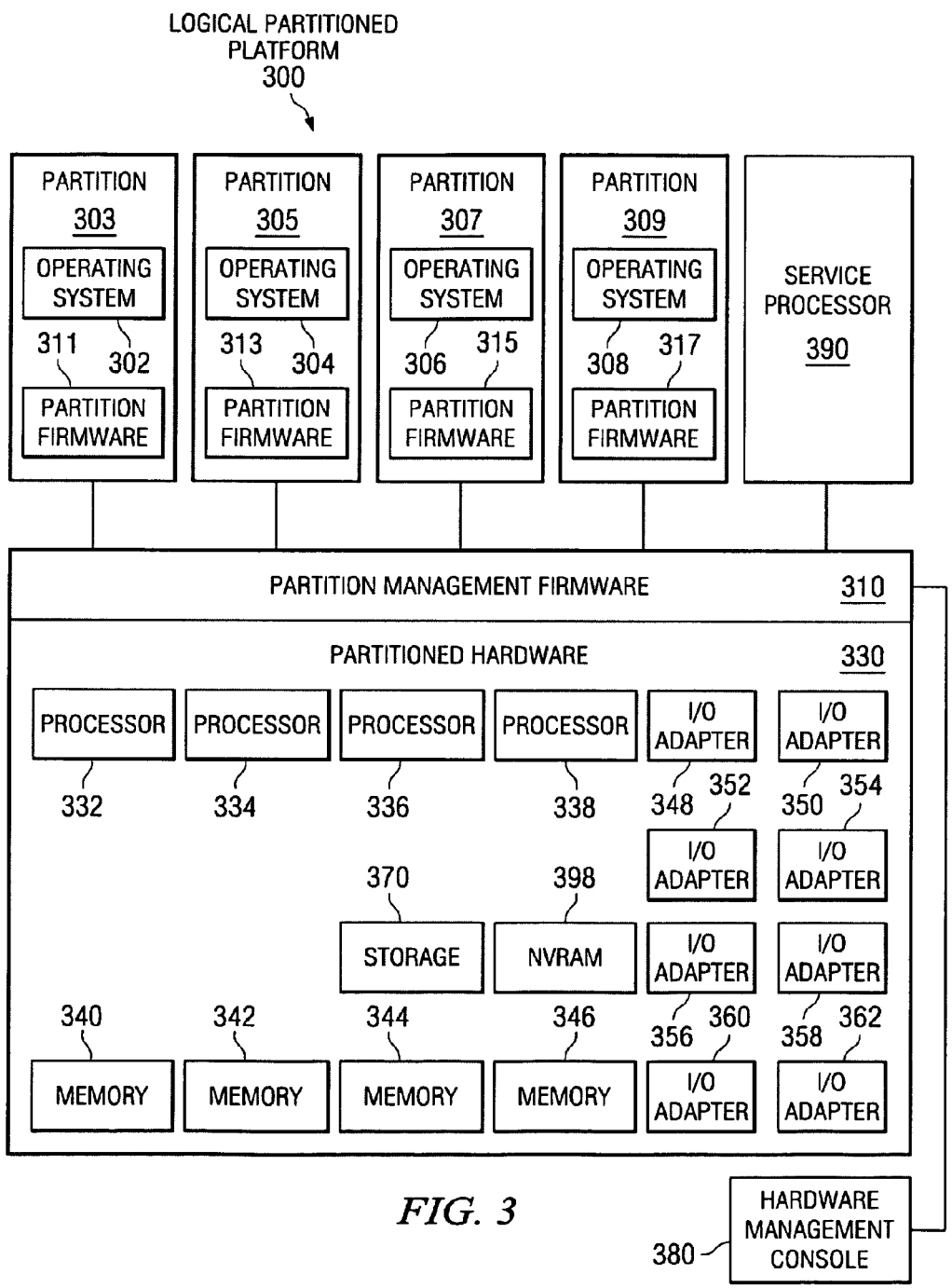
FIG. 3 is a block diagram of an exemplary logical partitioned platform in which illustrative embodiments may be implemented.

With reference now to FIG. 3, a block diagram of an exemplary logical partitioned platform is depicted in which illustrative embodiments may be implemented. The hardware in logical partitioned platform 300 may be implemented as, for example, data processing system 100 in FIG. 1. Logical partitioned platform 300 includes partitioned hardware 330, operating systems 302, 304, 306, 308, and partition management firmware 310. Operating systems 302, 304, 306, and 308 may be multiple copies of a single operating system or multiple heterogeneous operating systems simultaneously run on logical partitioned platform 300. These operating systems may be implemented using, without limitation, OS/400, which are designed to interface with a partition management firmware, such as Hypervisor, which is available from International Business Machines Corporation. OS/400 is used only as an example in these illustrative embodiments. Of course, other types of operating systems, such as AIX and Linux, may be used depending on the particular implementation. Operating systems 302, 304, 306, and 308 are located in partitions 303, 305, 307, and 309. Hypervisor software is an example of software that may be used to implement partition management firmware 310 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 311, 313, 315, and 317. Partition firmware 311, 313, 315, and 317 may be implemented using initial boot strap code, IEEE-1275 Standard Open Firmware, and runtime abstraction software (RTAS), which is available from International Business Machines Corporation. When partitions 303, 305, 307, and 309 are instantiated, a copy of boot strap code is loaded onto partitions 303, 305, 307, and 309 by partition management firmware 310. Thereafter, control is transferred to the boot strap code with the boot strap code then loading the open firmware and RTAS. The processors associated or assigned to the partitions are then dispatched to the partition's memory to execute the partition firmware.

Partitioned hardware 330 includes processors 332, 334, 336, and 338, memories 340, 342, 344, and 346, input/output (I/O) adapters 348, 350, 352, 354, 356, 358, 360, and 362, and a storage unit 370. Each of processors 332, 334, 336, and 338, memories 340, 342, 344, and 346, NVRAM storage 398, and I/O adapters 348, 350, 352, 354, 356, 358, 360, and 362 may be assigned to one of multiple partitions within logical partitioned platform 300, each of which corresponds to one of operating systems 302, 304, 306, and 308.

Partition management firmware 310 performs a number of functions and services for partitions 303, 305, 307, and 309 to create and enforce the partitioning of logical partitioned platform 300. Partition management firmware 310 is a firmware implemented virtual machine identical to the underlying hardware. Thus, partition management firmware 310 allows the simultaneous execution of independent OS images 302, 304, 306, and 308 by virtualizing all the hardware resources of logical partitioned platform 300.

Service processor 390 may be used to provide various services, such as processing of platform errors in the partitions. These services also may act as a service agent to report errors back to a vendor, such as International Business Machines Corporation. Operations of the different partitions may be controlled through a hardware management console, such as hardware management console 380. Hardware management console 380 is a separate data processing system from which a system administrator may perform various functions including reallocation of resources to different partitions.

Currently, the number of logical partitions that may be created on a partionable server is limited by the amount of real memory available on the server. That is, if the server has 32 gigabytes (GBs) of real memory, once the partitions that have been created have been allocated to those 32 gigabytes of real memory, no additional logical partitions can be activated on that server. The illustrative embodiments recognize that this places a restriction on configurations where customers want to have hundreds or even thousands of logical partitions on one server.

Therefore, the illustrative embodiments provide a computer implemented method, apparatus, and computer program code for extending virtual memory associated with logical partitions. A hosting partition receives a paging request from an extended virtual memory logical partition on a logically partitioned data processing system. In paging, main memory is divided into pages. The paging request may be a memory page-in request or a memory page-out request. A memory page-in reads data out of the physical memory and transfers the data into main memory. A memory page-out refers to transferring data from main memory into the physical memory.

When a process needs to access a page that is not currently in main memory, the location of the needed data in physical memory space is determined. The requested data is then loaded from the physical memory space into a page frame in the main memory.

In this example, the extended virtual memory logical partition does not utilize physical memory locally to the logically partitioned data processing system. Instead, the extended virtual memory logical partition is assigned to physical memory space on a remote computing device that is accessed via a network connection. The physical memory space may be space on a set of one or more physical hard disks on the remote computing device. For example, the physical memory space may include a set of physical memory frames on a single hard disk. The set of physical memory frames may include one or more physical memory frames. The paging request comprises instructions for a memory page-in or a memory page-out to the physical memory space assigned to the extended virtual memory logical partition. The instructions may include, without limitation, an identification of which bits to write to physical memory, an identification of which bits to read from physical memory, an identification of one or more specification physical memory addresses for the read or the write operation, and/or a tag identifying the physical memory space as physical memory space that is located on a remote computing device that can only be accessed using a network connection The hosting partition identifies a location of the physical memory space on the remote computing device assigned to the extended virtual memory logical partition located on the logically partitioned data processing system. Each physical memory frame is the size of a page. The physical memory frames in the set of physical memory frames may be contiguous or non-contiguous physical memory frames on the hard disk. The hosting partition may identify the location of the physical memory space using the tag in the memory read or memory write request received by the hosting partition. The hosting partition may use this information to establish a communications link with the remote computing device if a communications link over the network has not already been established.

The hosting partition generates and sends an extended virtual memory paging request from the hosting partition to an extended virtual memory manager located on the remote computing device using a network connection. The extended virtual memory paging request comprises the instructions for the memory page-in or the memory page-out and the location of the physical memory space on the remote computing device that is being paged-in or paged-out. The extended virtual memory manager performs a page-in operation or a page-out operation on the physical memory space assigned to the extended virtual memory logical partition in accordance with the instructions for the memory page-in or memory page-out.

Figure 4:
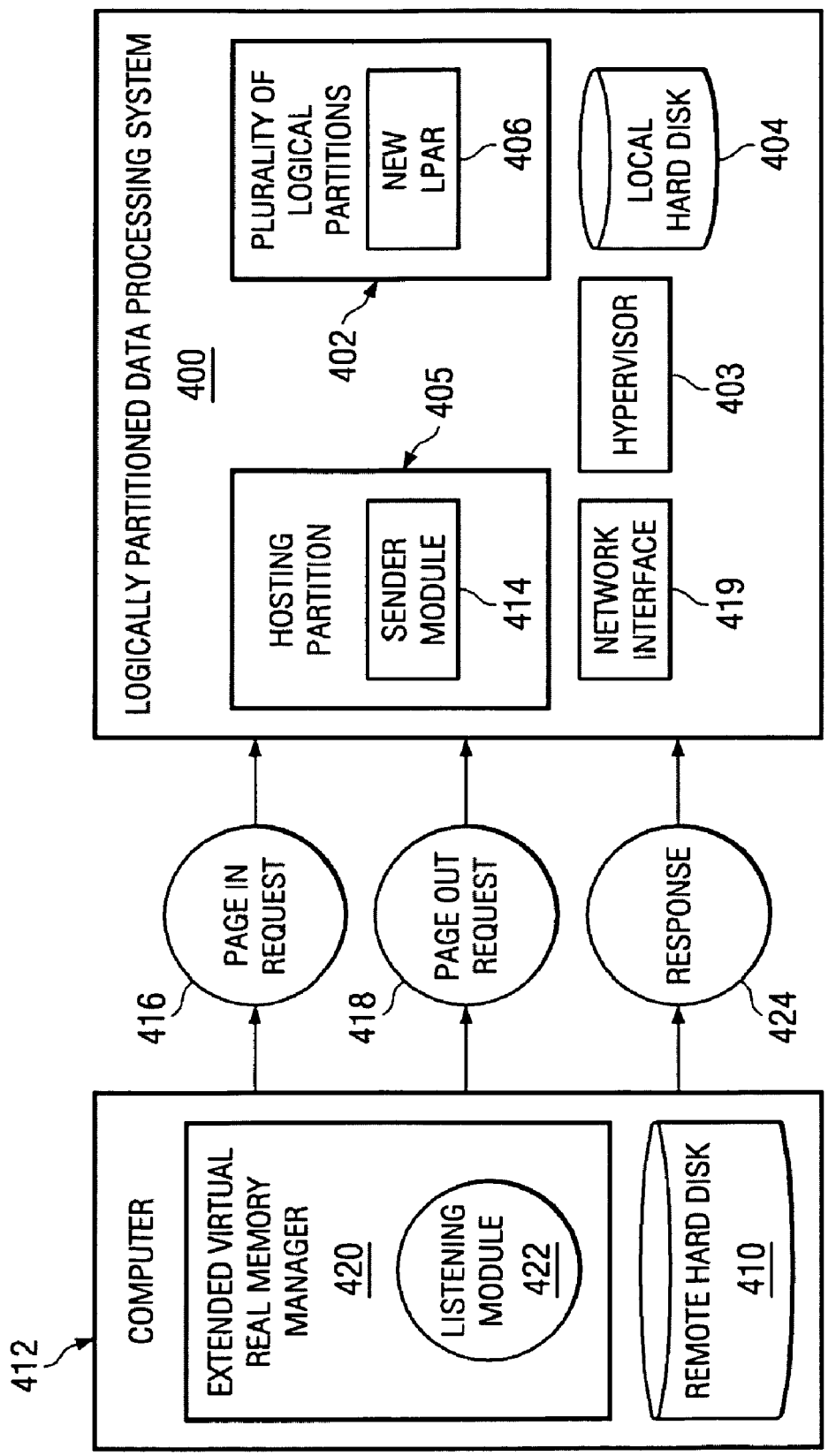
FIG. 4 is a block diagram of a logically partitioned data processing system and an extended virtual memory manager on a remote computing device in accordance with an illustrative embodiment.

FIG. 4 is a block diagram of a logically partitioned data processing system and an extended virtual memory manager on a remote computing device in accordance with an illustrative embodiment. Logically partitioned data processing system 400 is a data processing system that includes plurality of logical partitions 402, such as partitions 303-309 in FIG. 3. Logically partitioned data processing system 400 utilizes extended virtual real memory to create logical partitions that are over-subscribed in terms of their real memory usage.

The extended virtual real memory allows logical partitions to be created using physical disk space that is located remotely to logically partitioned data processing system 400 and accessed by logically partitioned data processing system 400 using a network connection. Hypervisor 403 running on logically partitioned data processing system 400 performs page-in and page-out requests to local hard disk 404 and sends the page-in and page-out requests for the remote physical memory on the network to hosting partition 405. This allows logically partitioned data processing system 400 to extend the amount of physical disk storage available for paging purposes outside the server associated with logically partitioned data processing system 400, by enabling page-in and page-out requests to go to other servers across the network. For example, and without limitation, if logically partitioned data processing system 400 has 32 gigabytes of physical memory in local hard disk 404 and logically partitioned data processing system 400 has access to another 64 gigabytes of physical memory on one or more remote hard disks available on the network, logical partitions may be created on logically portioned data processing system 400 that utilize 96 gigabytes of physical memory.

Thus, in this embodiment, when a new logical partition (LPAR), such as LPAR 406 is created, hosting partition 405 identifies available physical memory space in remote hard disk 410 and assigns the identified remote physical disk space on remote hard disk 410 to LPAR 406. Hosting partition is a special purpose logical partition that provides other client logical partitions in plurality of logical partitions 402 with virtualized input/output resources on remote computing devices, such as, without limitation, a virtual input/output server (VIOS).

LPAR 406 utilizes the assigned physical disk space for storing data associated with new LPAR 406, performing page-in requests, and performing page-out requests for LPAR 406.

Remote hard disk 410 is a physical storage space on a computer 412. Computer 412 may be implemented using any type of computing device, such as a personal computer, laptop, personal digital assistant, or any other computing device depicted in FIGS. 1 and 2. Computer 412 is remote to logically partitioned data processing system 400. Logically portioned data processing system 400 exchanges data with computer 412 via a network connection.

When LPAR 406 sends a page-in request to move data from the physical memory space on computer 412 into main memory on logically portioned data processing system 400, hypervisor 403 sends the page-in request to hosting partition 405 on logically partitioned data processing system 400. The page-in request may include instructions for the memory page-in, such as an identification of which bits to read into main memory, an identification of the physical memory frames to be paged-into main memory, a tag identifying the page-in request as a request to page-in data from a remote physical memory space on a remote hard disk, or any other information associated with performing the page-in request. Hosting partition 405 then identifies an address or location of physical memory space on remote hard disk 410 on computer 412 assigned to LPAR 406. If the instructions in the page-in request do not include the identification of the address or location of the physical memory space to be used during the page-in operation, hosting partition 405 may request that location of the physical memory space from hypervisor 403. Hosting partition 405 generates page-in request 416.

Hosting partition 405 includes sender module 414. Sender module 414 is a software component for enabling hosting partition 405 to send requests, such as page-in request 416 and page-out request 418, to a server or a computing device on a network. Sender module 414 packages page-in request 416 for transmission over the network connection and sends page-in request 416 to computer 412. Page-in request 416 may include the instructions for the memory page-in and the identification of the location of the physical memory space to be used for the page-in operation.

When LPAR 406 sends a page-out request to transfer a page of data from main memory to the physical memory space on computer 412, hypervisor 403 sends the page-out request to hosting partition 405. The page-out request may include instructions for the memory page-out, such as an identification of which bits to page-out of main memory and back into physical memory space assigned to LPAR 406, an identification of the physical memory frames to be used for the page-out from main memory, a tag identifying the page-out request as a request to page-out data from main memory and to a remote physical memory space on a remote hard disk, or any other information associated with performing the page-out request. Hosting partition 405 then identifies an address or location of physical memory space on remote hard disk 410 on computer 412 assigned to LPAR 406. If the instructions in the page-out request do not include the identification of the address or location of the physical memory space to be used during the page-in operation, hosting partition 405 may request that location of the physical memory space from hypervisor 403.

Hosting partition 405 generates page-out request 416 and sender module 414 sends page-out request 418 to a recipient on the network, such as, without limitation, computer 412. Page-out request 418 may include the instructions for the memory page-out and the identification of the location of the physical memory space to be used for the page-in operation.

Network interface 419 creates the network connection between logically partitioned data processing system 400 and one or more other remote servers or other remote computing devices, such as computer 412. Network interface 419 is any type of network access software known or available for allowing logically partitioned data processing system 400 to access a network. Network interface 419 connects to a network connection, such as network 102 in FIG. 1. The network connection permits access to any type of network. The network connection may be a wired network connection, a wireless network connection, or any other type of connection. The network may be the Internet, an intranet, an Ethernet, a local area network, a wide area network, or any other type of network.

Extended virtual real memory manager 420 is software on a computing device that is remote to logically partitioned data processing system. Extended virtual real memory manager 420 may optionally be implemented as a special purpose logical partition or as a special purpose software component for responding to page-in and page-out requests received over the network. Extended virtual real memory manager 420 responds to page-in and page-out requests from logically partitioned data processing system 400. Extended virtual real memory manager 420 includes listening module 422. Listening module 422 listens for page-in requests and page-out requests from logically partitioned data processing system 400. In response to receiving page-in request 416 and/or page-out request 418 from hosting partition 405, extended virtual real memory manager 420 performs a read and/or a write associated with the page-in or page-out operation to the physical memory space identified in the request. The page-in or page-out operations may be performed in accordance with any paging methods or paging techniques, as well as any paging methods or techniques that may become known or available in the future.

In other words, extended virtual memory manager 420 performs the page-in operation or the page-out operation in accordance with the instructions in page-in request 416 and/or page-out request 418. When the page-in and/or page-out operation is complete, extended virtual real memory manager 420 sends response 424 to hosting partition 405. Response 424 may indicate that a page-out operation was successfully completed, include one or more pages of data that is to be loaded into main memory on logically partitioned data processing system 400 for a page-in operation, indicate a failure to complete a page-in operation, indicate a failure to complete a page-out operation, include a reason for a failure to complete a page-in or a page-out operation, and/or any other information associated with the requested page-in or page-out.

Figure 5:
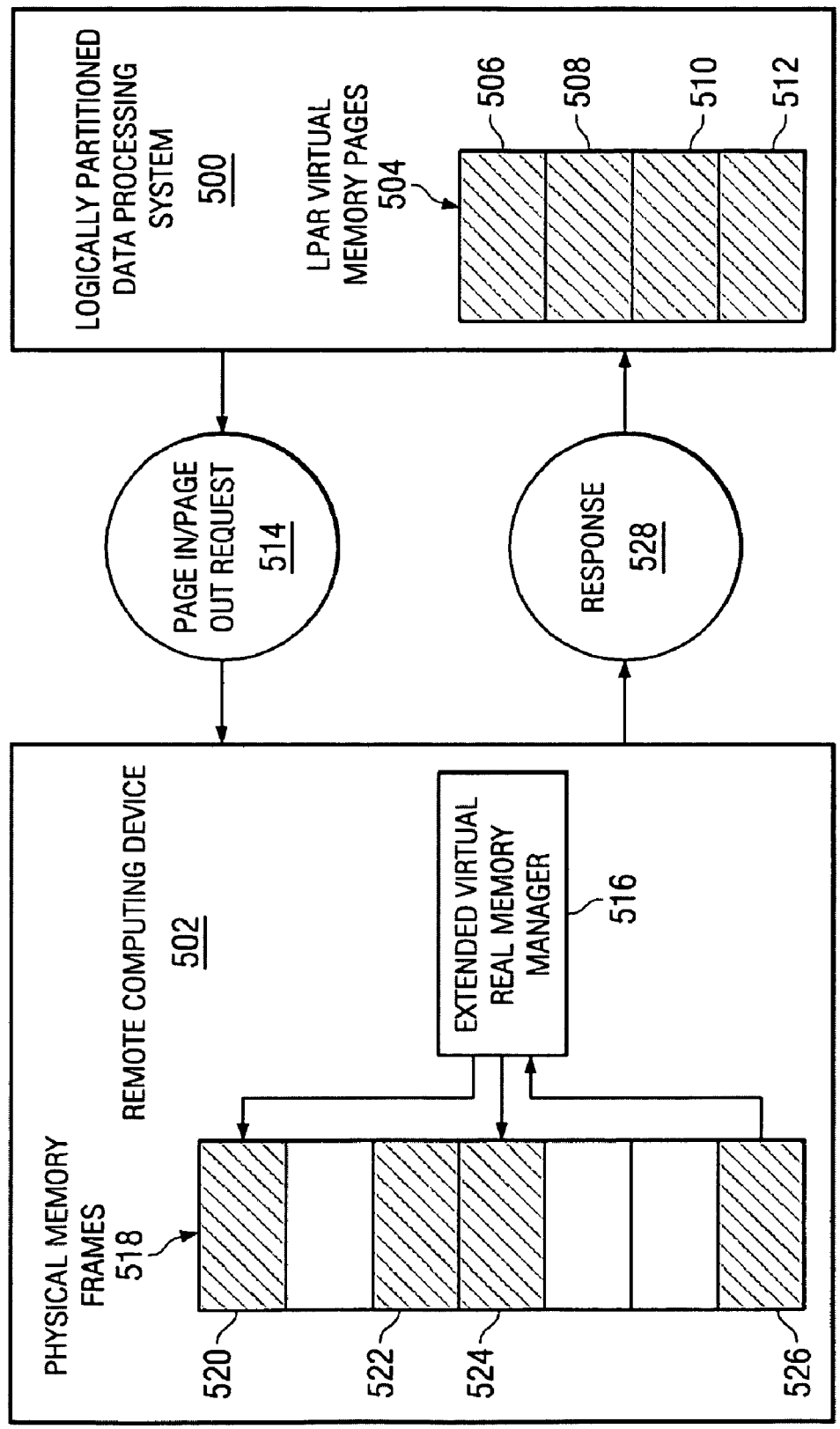
FIG. 5 is a block diagram of an extended virtual memory manager accessing physical memory frames assigned to an extended virtual memory logical partition in accordance with an illustrative embodiment.

Turning now to FIG. 5, a block diagram of an extended virtual memory manager accessing physical memory frames assigned to an extended virtual memory logical partition is shown in accordance with an illustrative embodiment. Logically partitioned data processing system 500 is a data processing system having, or capable of having, a plurality of logical partitions, such as logically partitioned data processing system 400 in FIG. 4. Remote computing device 502 may be a client device, a server, a desktop computer, a laptop computer, or any other type of computing device that is located remotely to logically partitioned data processing system 500 and capable of establishing a communications link with logically partitioned data processing system 500 via a network connection.

Logical partition (LPAR) virtual memory pages 504 are pages in a virtual memory for a logical partition. The logical partition sees virtual memory pages 506-512 as contiguous in local memory; however, the pages may be stored in arbitrary frames in physical memory on remote computing device 504. When the logical partition sends a paging request, such as page-in or page-out request 514, to remote computing device 502, extended virtual real memory manager 516 identifies a physical memory frame in physical memory frames 518 and performs the page-in or the page-out request on the identified physical memory frame. In this example, physical memory frames 520-526 are physical memory frames assigned to the logical partition. Thus, the logical partition on logically partitioned data processing system 500 may request page-in and page-out operations to be performed on physical memory frames 520-526 on remote computing device 502. When a given requested page-in or page-out operation is completed in accordance with the paging request, extended virtual memory manager 516 sends response 528 to logically partitioned data processing system 500 indicating whether the page-in operation or the page-out operation was completed successfully or failed to complete.

Figure 6:
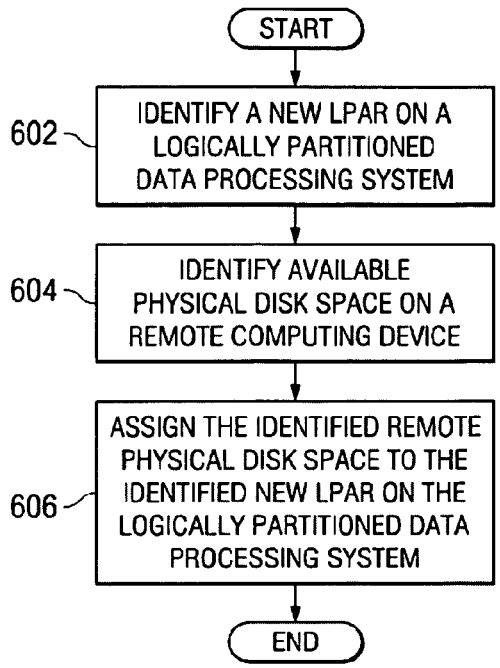
FIG. 6 is a flowchart of a process for assigning remote physical memory space to a logical partition in accordance with an illustrative embodiment.

FIG. 6 is a flowchart of a process for assigning remote physical memory space to a logical partition in accordance with an illustrative embodiment. The process in FIG. 6 is implemented by software for assigning physical disk space available on a remote server to logical partitions on a local logically partitioned data processing system, such as hosting partition 405 in FIG. 4.

The process begins by identifying a new logical partition (LPAR) on a logically partitioned data processing system (step 602). The process identifies available physical disk space on a remote computing device (step 604). A hosting partition may identify available remote physical disk space, for example and without limitation, by checking a table identifying available memory space, querying the remote computing device for an identification of available memory space, or prompting a user to provide input identifying available physical disk space on the remote computing device. The process assigns the identified remote physical disk space to the identified new logical partition on the logically partitioned data processing system (step 606) with the process terminating thereafter.

The process in FIG. 6 may also be implemented in part by a human user. In such a case, the hosting partition may prompt the human user to select a remote computing device having available physical disk space to be assigned to a newly created logical partition. In another embodiment, if the local physical disk space currently assigned to a given pre-existing logical partition is insufficient, the hosting partition may identify additional physical disk space on a remote computing device and assign the additional remote hard disk space to the pre-existing logical partition and de-allocate the local physical disk space for utilization by one or more other processes.

Figure 7:
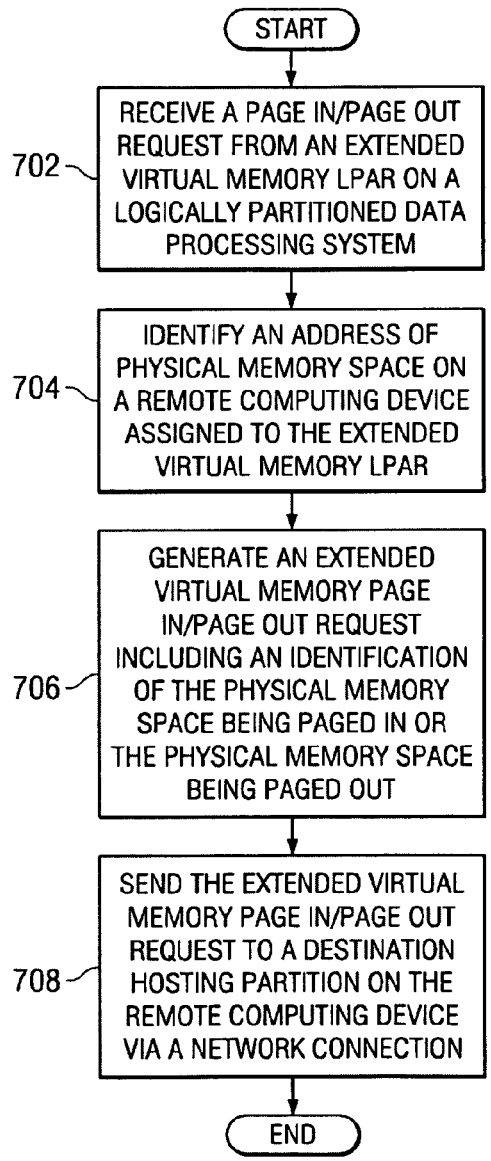
FIG. 7 is a flowchart of a process for sending an extended virtual memory page-in/page-out request in accordance with an illustrative embodiment.

Referring now to FIG. 7, a flowchart of a process for sending an extended virtual memory page-in/page-out request in accordance with an illustrative embodiment. The process in FIG. 7 may be implemented by software for generating an extended virtual memory paging request to an extended virtual memory manager, such as hosting partition 405 in FIG. 4.

The process begins by receiving a page-in or page-out request from an extended virtual memory logical partition on a logically partitioned data processing system (step 702). The hosting partition identifies an address of physical memory space on a remote computing device assigned to the extended virtual memory logical partition (step 704). The hosting partition generates an extended virtual memory page-in or page-out request, including an identification of the physical memory space being page-in or paged-out (step 706). The hosting partition sends the extended virtual memory page-in or page-out request to an extended virtual memory manager the remote computing device, such as extended virtual memory manager 420 in FIG. 4, via a network connection (step 708) with the process terminating thereafter.

Figure 8:
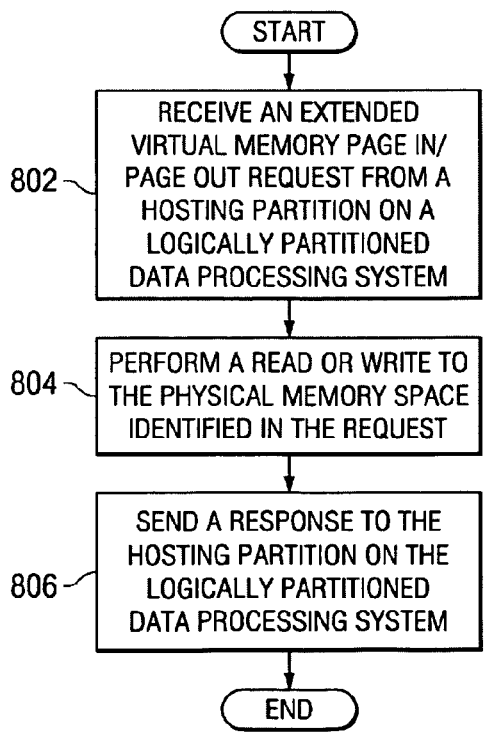
FIG. 8 is a flowchart of a process for responding to an extended virtual memory page-in/page-out request in accordance with an illustrative embodiment.

FIG. 8 is a flowchart of a process for responding to an extended virtual memory page-in/page-out request in accordance with an illustrative embodiment. The process in FIG. 8 is implemented by software for responding to extended virtual memory page-in or page-out requests, such as extended virtual memory manager 420 in FIG. 4.

The process begins by receiving an extended virtual memory page-in or page-out request from a hosting partition on a logically partitioned data processing system (step 802). The extended virtual memory manager performs a read operation or a write operation on the physical memory space identified in the request (step 804) in accordance with instructions in the request. The extended virtual memory manager sends a response to the hosting partition on the locally partitioned data processing system (step 806) with the process terminating thereafter.

According to one embodiment of the present invention, a computer implemented method, apparatus, and computer program code for extending virtual memory associated with logical partitions is provided. A hosting partition receives a paging request from an extended virtual memory logical partition on a logically partitioned data processing system. The extended virtual memory logical partition is assigned to physical memory space on the remote computing device. The paging request comprises instructions for a memory page-in or a memory page-out to the physical memory space assigned to the extended virtual memory logical partition. The hosting partition identifies a location of the physical memory space on the remote computing device assigned to the extended virtual memory logical partition located on the logically partitioned data processing system. The hosting partition sends an extended virtual memory page-in or page-out request from the hosting partition to an extended virtual memory manager located on the remote computing device using a network connection. The extended virtual memory page-in or page-out request comprises the instructions for the memory page-in or the memory page-out and the location of the physical memory space on the remote computing device that is being paged-in or paged-out. The extended virtual memory manager performs a page-in operation or a page-out operation on the physical memory space assigned to the extended virtual memory logical partition in accordance with the instructions for the memory page-in or memory page-out.

The hosting partition allows a virtually unlimited number of other servers to provide unused disk storage for paging purposes. This eliminates the limitations currently imposed by paging. The hosting partition enables the transfer of logical partition memory from one server to another in the form of page-in/page-out requests to an extended virtual memory manager on a remote computing device. The extended virtual memory manager than services the page-in/page-out requests locally with its own disk storage on the remote computing device. The page-in/page-out requests may optionally be tagged to identify the requests as extended virtual memory page-in/page-out requests so that the hosting partition knows to tap into the networking components used for partition mobility to transport the memory being paged in or out through a reliable network connection to the destination remote disk storage device, which receives and services the request with storage space available on the local remote storage device. Thus, the hosting partition and the extended virtual memory manager enables virtually limitless memory for logical partitions that is only limited by the amount of physical disk storage of any server reachable through a network.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of extending virtual memory associated with logical partitions in a system having a first virtual memory limit, the computer implemented method comprising:
receiving a paging request from an extended virtual memory logical partition on a logically partitioned data processing system, the data processing system having a first virtual memory limit, wherein the extended virtual memory logical partition is assigned to physical memory space on a remote computing device, and wherein the paging request comprises instructions for a memory page-in or a memory page-out to the physical memory space assigned to the extended virtual memory logical partition;

identifying a location of the physical memory space on the remote computing device assigned to the extended virtual memory logical partition, by a hosting partition located on the logically partitioned data processing system;

sending an extended virtual memory paging request from the hosting partition to an extended virtual memory manager located on the remote computing device using a network connection, wherein the extended virtual memory paging request comprises the instructions for the memory page-in or the memory page-out and the location of the physical memory space on the remote computing device that is being paged-in or paged-out, and wherein the extended virtual memory manager performs a page-in operation or a page-out operation on the physical memory space assigned to the extended virtual memory logical partition in accordance with the instructions for the memory page-in or memory page-out;

receiving the paging request at a listening module of the extended virtual memory manager;

creating a new logical partition in a plurality of logical partitions;

identifying an available physical memory space on the remote computing device; and assigning the available physical memory space on the remote computing device to the new logical partition on the logically partitioned data processing system so as to increase the memory beyond the first virtual memory limit.

2. The computer implemented method of claim 1 wherein the physical memory space on the remote computing device is a set of physical memory frames on a hard disk located remotely to the logically partitioned data processing system.

3. The computer implemented method of claim 1 wherein the paging request is a memory page-in request and wherein the instructions comprise an identification of a set of bits to be copied into main memory on the logically partitioned data processing system.

4. The computer implemented method of claim 1 wherein the paging request is a memory page-out request and wherein the instructions comprise an identification of a set of bits to be copied from main memory and into a set of physical memory frames on a hard disk on the logically partitioned data processing system.

5. The computer implemented method of claim 1 wherein the paging request comprises a tag, wherein the tag identifies the paging request as a request from a logical partition assigned to utilize physical memory space on a remote data storage device that is accessible over a network connection.

6. The computer implemented method of claim 1 further comprising:

responsive to identifying an extended virtual memory tag in the memory page-in or memory page-out request, accessing networking components and establishing a network connection with the remote computing device.

7. A computer program product for extending virtual memory associated with logical partitions, the computer program product comprising:

a non-transitory computer usable medium having computer usable program code embodied therewith, the computer usable program code comprising:

computer usable program code configured to receive a paging request from an extended virtual memory logical partition on a logically partitioned data processing system, wherein the extended virtual memory logical partition is assigned to physical memory space on a remote computing device, and wherein the paging request comprises instructions for a memory page-in or a memory page-out to the physical memory space assigned to the extended virtual memory logical partition;

computer usable program code configured to identify a location of the physical memory space on the remote computing device assigned to the extended virtual memory logical partition, by a hosting partition located on the logically partitioned data processing system;

computer usable program code configured to send an extended virtual memory paging request from the hosting partition to an extended virtual memory manager located on the remote computing device using a network connection, wherein the extended virtual memory paging request comprises the instructions for the memory page-in or the memory page-out and the location of the physical memory space on the remote computing device that is being paged-in or paged-out, and wherein the extended virtual memory manager performs a page-in operation or a page-out operation on the physical memory space assigned to the extended virtual memory logical partition in accordance with the instructions for the memory page-in or memory page-out;

computer usable program code configured to receive the paging request at a listening module of the extended virtual memory manager;

computer usable program code configured to creating a new logical partition in a plurality of logical partitions;

computer usable program code configured to identifying an available physical memory space on the remote computing device; and computer usable program code configured to assigning the available physical memory space on the remote computing device to the new logical partition on the logically partitioned data processing system.

8. The computer program product of claim 7 wherein the physical memory space on the remote computing device is a set of physical memory frames on a hard disk located remotely to the logically partitioned data processing system.

9. The computer program product of claim 7 wherein the paging request comprises a tag, wherein the tag identifies the paging request as a request from a logical partition assigned to utilize physical memory space on a remote data storage device that is accessible over a network connection.

10. The computer program product of claim 7 further comprising:

computer usable program code configured to identify an extended virtual memory tag in the paging request and access networking components and establishing a network connection with the remote computing device.

11. An apparatus comprising:

a bus system;

a communications system coupled to the bus system;

a memory connected to the bus system, wherein the memory includes computer usable program code; and a processing unit coupled to the bus system, wherein the processing unit executes the computer usable program code to receive a paging request from an extended virtual memory logical partition on a logically partitioned data processing system, wherein the extended virtual memory logical partition is assigned to physical memory space on a remote computing device, and wherein the paging request comprises instructions for a memory page-in or a memory page-out to the physical memory space assigned to the extended virtual memory logical partition; identify a location of the physical memory space on the remote computing device assigned to the extended virtual memory logical partition, by a hosting partition located on the logically partitioned data processing system; send an extended virtual memory paging request from the hosting partition to an extended virtual memory manager located on the remote computing device using a network connection, wherein the extended virtual memory paging request comprises the instructions for the memory page-in or the memory page-out and the location of the physical memory space on the remote computing device that is being paged-in or paged-out, and wherein the extended virtual memory manager performs a page-in operation or a page-out operation on the physical memory space assigned to the extended virtual memory logical partition in accordance with the instructions for the memory page-in or memory page-out; receive the paging request at a listening module of the extended virtual memory manager, execute the computer usable program code to create a new logical partition in a plurality of logical partitions; identify an available physical memory space on the remote computing device; and assign the available physical memory space on the remote computing device to the new logical partition on the logically partitioned data processing system.

12. The apparatus of claim 11 wherein the physical memory space on the remote computing device is a set of physical memory frames on a hard disk located remotely to the logically partitioned data processing system.

13. The apparatus of claim 11 wherein the paging request comprises a tag, wherein the tag identifies the paging request as a request from a logical partition assigned to utilize physical memory space on a remote data storage device that is accessible over a network connection.

14. A data processing system comprising:
- a logical partition on a logically partitioned data processing system, wherein the logical partition is assigned to utilize physical memory space located on a remote data storage device;
- a hypervisor, wherein the hypervisor sends a page-in or a page-out request to a hosting partition on the logically partitioned data processing system in response to receiving a paging request from the logical partition, wherein the paging request comprises instructions for a memory page-in or a memory page-out to the physical memory space assigned to an extended virtual memory logical partition;
- the hosting partition, wherein the hosting partition identifies a location of the physical memory space on the remote computing device assigned to the extended virtual memory logical partition, by a hosting partition located on the logically partitioned data processing system; and sends an extended virtual memory paging request from the hosting partition to an extended virtual memory manager located on the remote computing device using a network connection, wherein the extended virtual memory paging request comprises the instructions for the memory page-in or the memory page-out and the location of the physical memory space on the remote computing device that is being paged-in or paged-out, and wherein the extended virtual memory manager performs a page-in operation or a page-out operation on the physical memory space assigned to the extended virtual memory logical partition in accordance with the instructions for the memory page-in or memory page-out; creates a new logical partition in a plurality of logical partitions; identifies an available physical memory space on the remote computing device; and assigns the available physical memory space on the remote computing device to the new logical partition on the logically partitioned data processing system so as to increase the memory beyond the first virtual memory limit, and
- a listening module on the extended virtual memory manager on the remote computing device, wherein the listening module listens for page-in requests and page-out requests received from the logically partitioned data processing system over the network connection.

15. The data processing system of claim 14 wherein the physical memory space on the remote computing device is a set of physical memory frames on a hard disk located remotely to the logically partitioned data processing system.

16. The data processing system of claim 14 wherein the paging request comprises a tag, wherein the tag identifies the paging request as a request from a logical partition assigned to utilize physical memory space on a remote data storage device that is accessible over a network connection.

* * * * *